United States Patent [19]

Fujisaki et al.

[11] Patent Number: 4,684,839
[45] Date of Patent: Aug. 4, 1987

[54] STRUCTURE OF ELECTRIC MOTOR AND PRODUCTION METHOD THEREOF

[76] Inventors: Kiyonori Fujisaki, 195-4 Ooyaguchi, Maatsudo-shi, Chiba-ken; Toshio Kobayashi, 6-1-13 Kitakarasuyama, Setagaya-ku, Tokyo, both of Japan

[21] Appl. No.: 749,586

[22] Filed: Jun. 27, 1985

[30] Foreign Application Priority Data

| Jan. 9, 1985 | [JP] | Japan | 60-1882 |
| Jan. 9, 1985 | [JP] | Japan | 60-1883 |
| Jan. 9, 1985 | [JP] | Japan | 60-1884 |
| Jan. 9, 1985 | [JP] | Japan | 60-1885 |
| Jan. 9, 1985 | [JP] | Japan | 60-1886 |

[51] Int. Cl.$^4$ .................................. H02K 21/26
[52] U.S. Cl. .................................. 310/154; 310/268
[58] Field of Search .................... 310/152–156, 310/268

[56] References Cited

U.S. PATENT DOCUMENTS

| 3,109,114 | 10/1963 | Henry-Baudot | 310/268 |
| 3,280,353 | 10/1966 | Haydon et al. | 310/154 |
| 3,320,454 | 5/1967 | Kober | 310/268 |
| 3,566,165 | 2/1971 | Lohr | 310/154 X |
| 4,080,544 | 3/1978 | Aoki | 310/268 |
| 4,093,882 | 6/1978 | Furuta | 310/268 |
| 4,494,026 | 1/1985 | Abe | 310/239 X |

Primary Examiner—Donovan F. Duggan
Attorney, Agent, or Firm—Robert F. Ziems

[57] ABSTRACT

The invention relates to an electric motor having armature means including a plurality of armature segments each rendered into a flat form and arranged in a same plane around a center rotation axis in a manner as to form a circular outline; magnet means including a plurality of permanent magnet segments arranged in a same plane opposite to the armature segments coaxially on one side thereof with an air gap being provided therebetween, each of the permanent magnet segments having end portions in the radial direction defined by a geometrical line dividing the permanent magnet segments one from another, the dividing line being designed to extend in avoidance to be in parallel with a normal extended from the center rotation axis of the armature segments, said dividing line of each permanent magnet segment extending in parallel with another dividing line of the adjacent magnet segment to provide therebetween a groove of a predetermined width.

5 Claims, 18 Drawing Figures

STRUCTURE OF ELECTRIC MOTOR AND PRODUCTION METHOD THEREOF

BACKGROUND OF THE INVENTION

The present invention relates to an electric motor and more particularly relates to the structure of a small and flat-type electric motor and the production method thereof; wherein the permanent magnet segments are so formed and so arranged as to prevent the abrupt change in the distribution of magnetic flux which may otherwise be caused each time the armature segments travel past the electric position, to thereby smoothly rotate the motor without variations in the rotation torque. Moreover a groove provided between the permanent magnet segments may be effectively utilized and the motor may be easily assembled.

Recently the small and disk-shaped electric motors have been widely used in toys, portable stereo cassette tape recorders, small-type audio systems, cameras, etc. As these devices are required to be further miniaturized and to have a higher performance, the small and disk-shaped electric motors have been accordingly required to be smaller and also to be flat to the maximum extent with a high property being maintained.

Now the conventional small and disk-shaped electric motors have a plurality of permanent magnet segments arranged in a same plane opposite to a plurality of armature segments with a common center axis to provide therebetween a magnetic field, wherein the permanent magnet segments are divided from each other by the geometrical lines which may be parallel with a normal extended from the center rotation axis of the armature segments. In other words the dividing lines of the permanent magnet segments are extended in the radial direction. Therefore the armature segments subject to the shock due to the abrupt change in the distribution of magnetic flux which is caused by the permanent magnet segments each time the armature segments pass the electric positions, and as the result the torque varies affecting the rotation of the motor.

Further the conventional small and disk-shaped electric motors have a commutator and brushes to be contacted to the commutator provided on one side of the armature segments, on the opposite side of which are arranged the permanent magnet segments with an air gap provided therebetween. It has therefore been required to provide a space between the armature segments and the motor case to accommodate therein the commutator and the brushes. Such an arrangement of elements has prevented the motor from being made smaller and more flat. Further the conventional commutator has the commutator segments arranged in a cylindrical form around the center rotation axis of the armature segments. It has therefore been required to assemble the commutator and brushes under the condition that the elastic brush carriers are kept pressed. Thus the production process has required an elaborating and time consuming work.

Further the conventional small and disk-shaped electric mortors have been of a moving-coil type instead of a slot-type in which the winding of coil is rather difficult and also the weight of rotor increases, because the moving-coil type has the properties of little rotational variations and of low inductance. However actually the motor of moving-coil type has an armature segments generally providing a low density of magnetic flux to be produced. This means that it is difficult to obtain a desired torque by means of a ferrite permanent magnet segments in case of the extremely flat motor. Therefore in order to obtain a desired torque, it is required to employ a samarium cobalt permanent magnet segments which are extremely expensive, and accordingly the cost of the motor becomes higher.

Further the conventional small and disk-shaped electric motors have generally an iron case constituting a part of magnetic circuit together with the permanent magnet segments and the armature segments so as to produce a magnetic field in which the armature segments may be rotated. In this case, in order to increase the torque of the motor, it is required to make the two air gaps small as much as possible which are to be provided between the armature segments and the permanent magnet segments and between the armature segments and the motor case. However for satisfying this requirements, the motor case must be formed with an extremely high precision. Actually it has been difficult to provide a desired air gap between the armature segments and the motor case in the small and flat-type electric motor, and it has been unavoidable to set the air gap bigger than that to be desired. Thus there has been a limitation in setting a maximum possible output of the motor. Moreover the motor case has been made of a magnetic material such as iron which has to be precisely processed, for example, by way pressing, and accordingly the production cost increases.

Still further the conventional small and disk-shaped electric motors have been of a moving-coil type instead of a slot-type which requires a rather complex winding of coil resulting in the difficulty of reducing the size of the armature segments, because the moving-coil type is suitable for reducing the size as well as the weight of the armature segments. However the armature coils of the moving-coil type motor are axially hollow and therefore the coercive force is smaller and also the density of magnetic flux is lower. It has therefore been difficult to obtain a desired torque. For obtaining a desired torque, it has been required to employ a samarium cobalt permanent magnet segments which have a high density of magnetic flux, but which are extremely expensive. An experiment has been made in combination of the ferrite permanent magnet segments and making up an extremely flat motor of less than the thickness of 6 mm and of three armature segments with bipolar electrodes. The experiment has proved that such a motor will not produce a torque which may be practically available. Then the inventor of this application has had a thought of inserting an iron core into each of the axially hollow armature segments so as to concentrate the magnetic flux to the axial part of the armature segments. Moreover the inventor has thought it better to make the iron core by laminating a leaf plate to more heighten the coercive force.

BRIEF SUMMARY OF THE INVENTION

The present invention has been provided to eliminate the defects and disadvantages of the prior art.

One aspect of the invention is to provide a small and disk-shaped electric motor in which a predetermined number of armature segments are each rendered into a flat form and arranged in a same plane around a center rotation axis in a manner as to form a circular outline, and a predetermined number of permanent magnet segments are arranged in a same plane opposite to the armature segments coaxially on one side thereof with an air gap existing therebetween, each of the permanent magnet segments having end portions in the radial direction defined by a geometrical line dividing the permanent magnet segments one from another, the dividing line being designed to extend in avoidance to be in parallel with a normal extended from the center rotation axis of the armature segments, that is to extend not in the radial direction, whereby when the armature segments travel past the electric positions of the magnet segments, the armature segments will not abruptly come into and out of the distribution of magnetic flux of the permanent magnet segments, but to progressively come into and out of the distribution of magnetic flux of the permanent segments so as to reduce the torque variations and smooth the rotation of the motor.

Another aspect of the invention is to form up the permanent magnet segments as to provide a groove of constant width between the adjacently arranged permanent magnet segments to effectively utilize the groove and further to make easy the production of the permanent magnet segments as well as the assembly of the motor.

Another aspect of the invention is to properly arrange the brush units in the groove between the adjacently arranged permanent magnets in such a manner that each end of the brush units may contact a commutator, to thereby eliminate the necessity of providing a separate space in which to accommodate the brush units and also to reduce the axial dimension, that is, the thickness of the flat-type electric motor.

Another aspect of the invention is to render the commutator into a flat form and to arrange the same in a manner that the brush contacting face may be vertical to the rotation axis of the motor to make easy the assembly of the motor.

Another aspect of the invention is to attach a plate of magnetic material to each of the armature segments on one side thereof opposite to the permanent magnet segments and to attach a disk of magnetic material to the opposite side of the armature segments in such a manner that the disk traverses all of the armature segments to thereby form a magnetic circuit, whereby the air gap between the armature segments and the motor case may be dispensed with in the magnetic circuit.

Another aspect of the invention is to make small as much as possible the air gap between the armature segments and the permanent magnet segments to thereby concentrate the magnetic flux of the armature segments to the iron cores as well as the plates of the armature segments, thus to reduce the floating magnetic flux, whereby the magnetic flux produced from the armature segments may be increased so that the ferrite permanent magnet segments of low cost may be sufficiently used to obtain a strong enough torque.

Another aspect of the invention is to provide a small and disk-shaped electric motor which may be made further flat in case an expensive alnico or samarium cabalt permanent magnet segments.

Another aspect of the invention is to provide a small and flat-type electric motor having an air gap of the magnetic circuit which is about a half compared with that of the motor having the motor case utilized as a part of the magnetic circuit, that is, to form a magnetic circuit having only a quater of magnetic resistance, whereby the strong magnetic field may be used to obtain a biggest possible torque.

Another aspect of the invention is to use a motor case of non-magnetic material such as a synthetic resin to thereby more easily and more economically produce the small and disk-shaped electric motor.

Another aspect of the invention is to provide a motor case of synthetic resin mixed with a magnetic powder such as an iron powder so as to prevent the magnetic noise which may be produced while the motor is rotated, thus to eliminate the adverse influence to the electric instruments incorporated with this type of electric motor.

Another aspect of the invention is to form an iron core for each of the armature segments by winding a leaf plate of magnetic material in a shape of volution and then by pressing the wound leaf plate with a set of molds into a shape of sector having a center angle corresponding to the center angle of the armature segments, wherein the iron core is laminated in the direction parallel with the penetrating direction of magnetic flux to more increase the coercive force and to meet the requirement for concentrating the magnetic flux of the armature segments.

Other features and advantages of the invention will be apparent from the following description of a preferred embodiment in reference to the attached drawings.

DETAILED DESCRIPTION OF THE INVENTION

Figure 1:
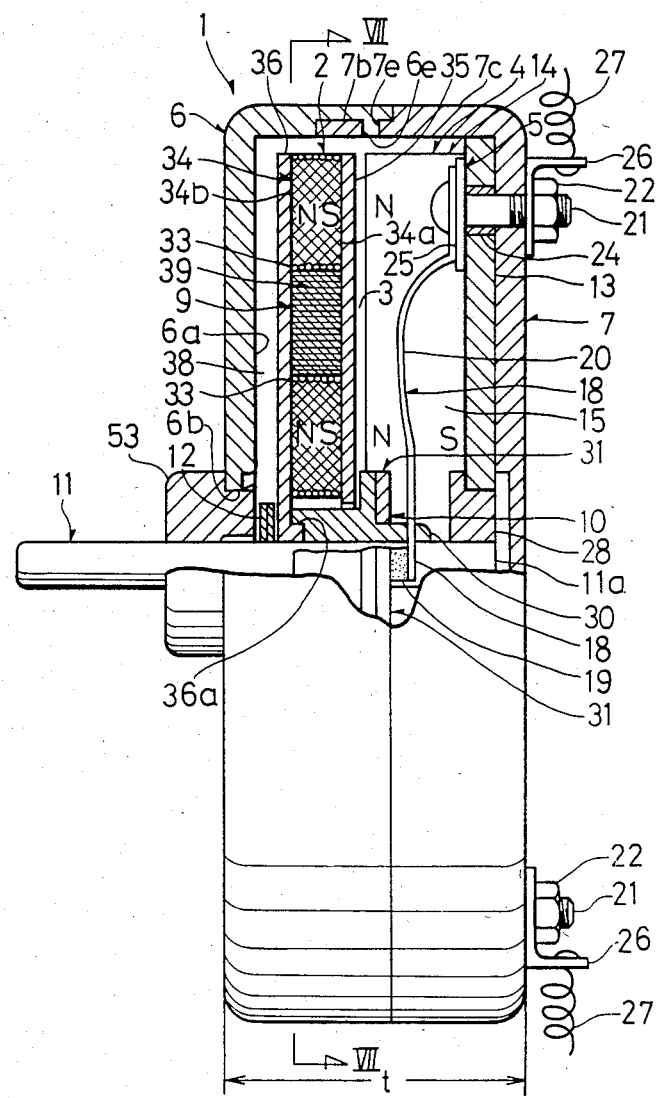
FIG. 1 is a side elevational view of a disk-shaped electric motor according to the invention shown partly in vertical section.

In reference to FIGS. 1 to 6, a disk-shaped electric motor 1 includes a permanent magnet 4 is divided into a plurality of segments, for example into two segments 14, 14, each of which has two end portions 14a defined by a geometrical line $l_1$ dividing the permanent magnet segment from the other, the dividing line $l_1$ being extended in non-parallel with a normal $l_2$ extending from the rotation center axis O of an armature 2. In other words, the dividing line $l_1$ is extended not radially of the rotation center axis O of the armature 2. The dividing lines $l_1$ of the two permanent magnet segments 14, 14 are extended in parallel with each other to thereby provide a groove 15 of a predetermined width therebetween.

Figure 3:
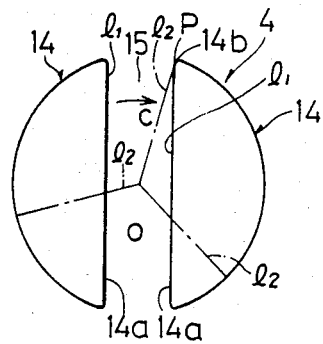
FIG. 3 is a diagramatical front elevational view of permanent magnet segments divided into two as a first embodiment and shown in relation to the rotation of armature segments.
Figure 4:
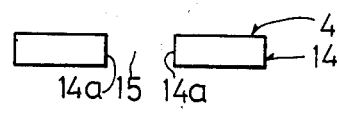
FIG. 4 is a plan view of the permanent magnet segments as shown in FIG. 3.
Figure 5:
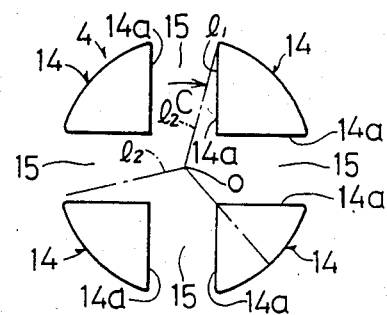
FIG. 5 is a diagramatical front elevational view of permanent magnet segments divided into four as a second embodiment and shown in relation to the rotation of the armature segments.
Figure 6:
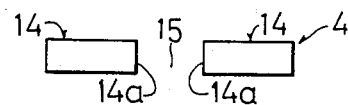
FIG. 6 is a plan view of the permanent magnet segments as shown in FIG. 5.

The permanent magnet 4 may be divided into four segments 14 as shown in FIG. 5. Even in this case, each of the magnets 14 has two end portions 14a defined by the geometrical line $l_1$ dividing the permanent magnet segment from the others and the dividing line $l_1$ is extended in non-parallel with the normal $l_2$ extending from the rotation center axis O of the armature 2. In other words, the dividing line $l_1$ is extended not radially of the center axis O of the armature 2. The opposite or adjacent dividing lines $l_1$ of the magnet segments 14 are designed to provide the vertical and transverse grooves 15 of a predetermined width between these magnet segments 14 in the same manner as shown in FIG. 3. Thus even if the permanent magnet 4 is divided into much more segments, the dividing lines $l_1$ may be designed to extend non-radially of the rotation center axis O of the armature 2.

Such an arrangement of the magnet segments 14 with respect to the armature 2 is to obtain an effect for preventing the abrupt change in the distribution of magnetic flux which may otherwise be caused each time the armature 2 travels past the electric positions and comes into the magnetic fields of the individual magnet segments 14, and thus to reduce the variations of torque.

Further in reference to FIGS. 1 to 6, the disk-shaped electric motor includes a brush mounting device 5 which is composed of a circular mount plate 13 of magnetic material having a pair of brush units 18 arranged diametrically opposite to each other and secured thereto. Each of the brush units 18 is composed of an elongated leaf spring 20 and a carbon brush element 19 secured to one end of the leaf spring 20, the other end of which is secured to the mount plate 13 radially of the center axis thereof by means of a screw 21, a washer 25 and an isolating element 24, the screw 21 being passed through the mount plate 13 and through one counter part 7 of a motor case and being screwed by a nut 22 on the outside of the motor case 7 with a brush terminal 26 having lead 27 being inserted between the nut 22 and the motor case 7. Thus screw 21 and the nut 22 cooperate to secure the leaf spring 20 to the disk plate 13, and the mount plate 13 to the inner side of the motor case 7. In this way the leaf springs 20 of the brush units 18 are extended toward the center axis of the mount plate 13 from the respective positions radially of the center axis, and thus the brush units 18 including the pair of carbon brush elements 19 are designed to be placed in the groove 15 between the two magnet segments 14 where the pair of brush elements 19 contact a commutator 10, wherein the brush units 18 are designed to have a dimension smaller than the thickness of the magnet segments 14 in the axial direction thereof.

The circular mount plate 13 is made of iron and has a bearing 28 secured to the center thereof, through which one end part 11a of a rotating shaft 11 of motor 1 is inserted. Thus the brush units 18 are completely accommodated in the groove 15, and therefore there is no need to separately provide a space to accommodate the brush units 18 therein. This will further enable the electric motor 1 to be made more flat.

The commutator 10 is of a flat-type and is secured to the rotating shaft 11 of the motor 1. The commutator 10 is divided, for example, into three sections in the circumferential direction by means of an isolating element 30 in accordance with the armature 2 having tri-polar electrodes. On the divided sections of the commutator there is mounted an electrically conductive plate 31 which is made of copper or a silver mixed metal in a manner as to be rotational in sliding engagement with the carbon brush elements 19.

In reference to FIGS. 1, 2, 7 and 8, the armature 2 is composed, for example, of three armature segments 34, each of which is formed with an iron core 9, an electrically conductive wire or leaf 33 wound around the iron core a predetermined times, a dividing plate 35 of magnetic material attached to one side 34a of each armature segment 34 and a single disk plate 36 of magnetically permeable or magnetizable material attached to the other side 34b of the armature segments, traversing all of the armature segments to form a magnetic circuit thereat. The armature 2 thus structured is secured at the center thereof to the rotating shaft 11 of the motor 1 together with the commutator 10 which is integral and axially in alignment with the armature 2. The dividing plates 35 and the disk plate 36 may be made of iron which is sufficient enough to provide a magnetic circuit between the permanent magnet 4, the mount plate 13 and the armature 2. Thus the magnetic circuit is designed to dispose with a space 38 between the disk plate 36 and the inner face 6a the other counterpart 6 of motor case as well as the motor case itself 6, 7. Further to more increase the magnetic force of the magnet circuit, another set of armature segments 34 may be attached to the opposite side of the disk plate 36.

The iron core 9 of each armature segment 34 is formed by winding a leaf plate of magnetic material so as to increase the coersive force compared with the solid one. Further as to the comparison between the conductive wire and the leaf forming each armature segment 34, if the conductive wire is wound 671 times to form up the armature segment 34, the leaf may be wound 855 turns to form up the same volume of armature segment, provided that the thickness of the leaf is $20\mu$. Thus the armature segment of the leaf will increase the occupation rate by 30% when compared with the armature segment of conductive wire. Therefore a set of armature segments of leaf is preferable to increase the output of the extremely small and flat-type electric motor.

Figure 7:
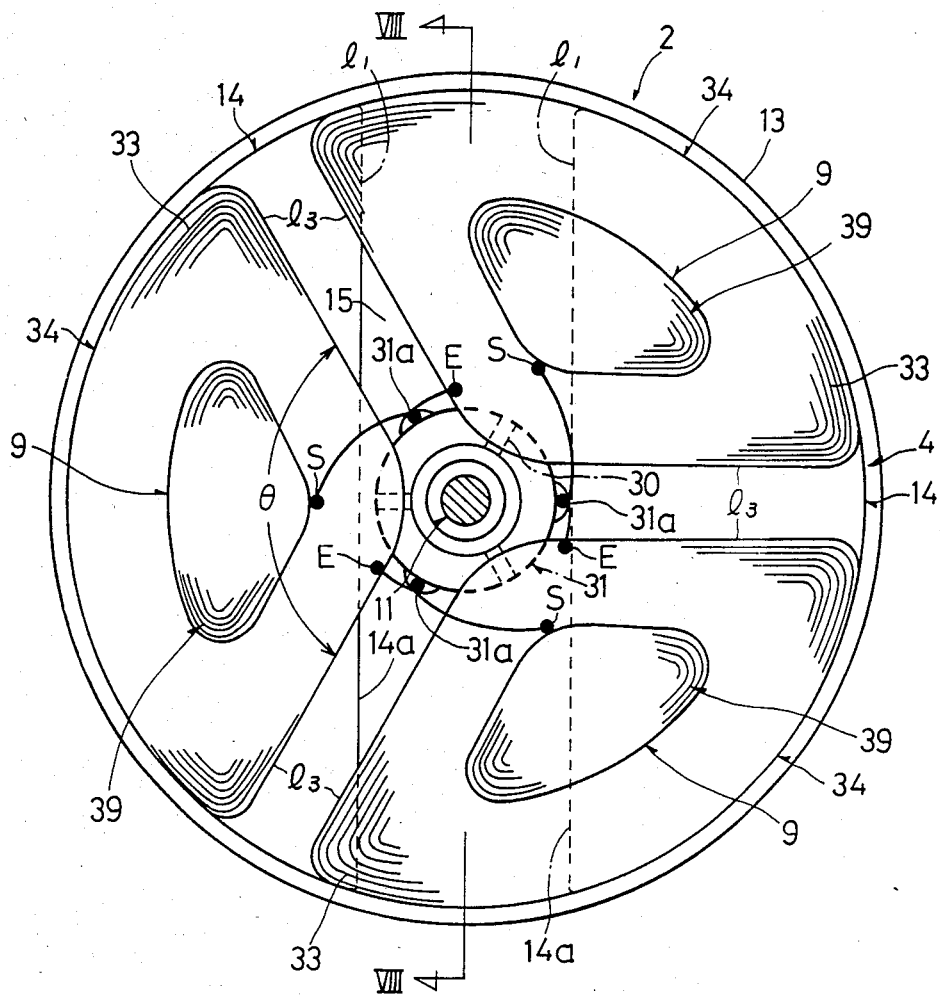
FIG. 7 is a front elevational view taken along the arrows VII—VII of FIG. 1 and shown partly eliminated.
Figure 8:
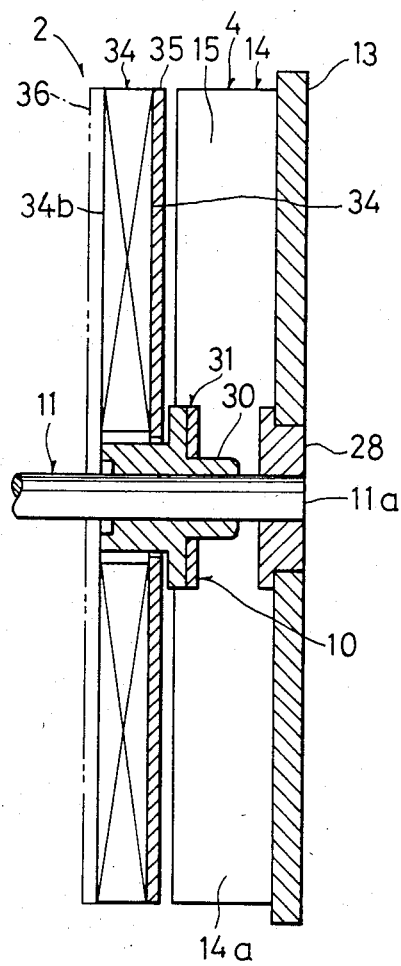
FIG. 8 is a vertical section taken along the arrows VIII—VIII of FIG. 7.
Figure 9:
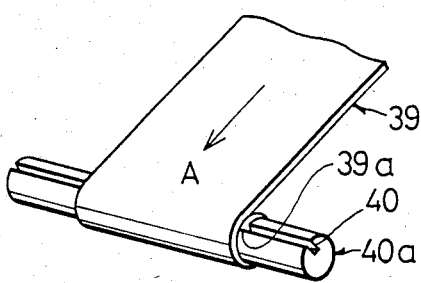
FIG. 9 is a perspective view of a leaf plate to be wound around a core shaft to make a coil.

In reference to FIG. 7 showing a delta connecting of the armature segments 34 to the commutator 10, each of the armature segments 34 has the initial end S of the wound wire or leaf connected to each of terminals 31a of the conductive plate 31 on the armature 2, each terminal being located in the counterclockwise direction with respect to each initial end S of the wound or leaf, and has the terminal end E of the wound wire or leaf connected to each of the terminals 31a located in the clockwise direction with respect to the terminal end E.

Figure 10:
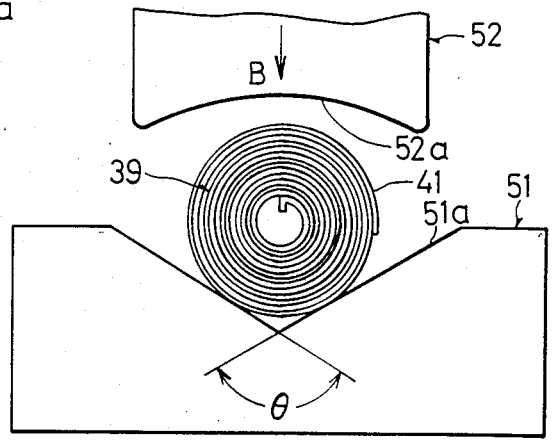
FIG. 10 is a front elevational view of the coil placed in a mold.
Figure 12:
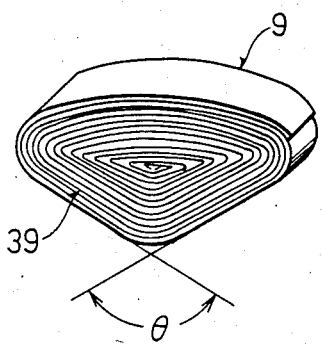
FIG. 12 is a perspective view of the coil molded up into an iron core for an armature segment.
Figure 11:
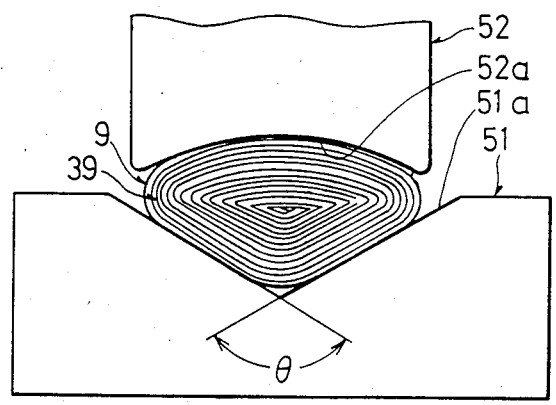
FIG. 11 is a front elevational view of the coil pressed by the mold.

In reference to FIGS. 9 to 12, the iron core 9 of each armature segment 34 is formed up by winding a leaf plate 39 of magnetic material such as iron around a core shaft 40 in the direction as indicated by an arrow A. In this case, the forward end 39a of the leaf plate 39 is inserted into a groove 40a provided at the core shaft 40 in the axial direction thereof, and then the core shaft 40 is rotated to wind the leaf plate 40 therearound. The core shaft 40 may be a solid iron shaft of a diameter approximately 1.5 mm. The core shaft 40 is rotated until the leaf plate 39 becomes a coil 41 in the form of volution having a circular vertical section of a predetermined diameter as shown in FIG. 10. Then the core shaft 40 is pulled out of the coil 41. In the next step, the coil 41 is pressed by a pair of molds 51, 52, the mold 51 having a V-shaped groove 51a defining a center angle corresponding to the center angle θ of each armature segment 34 which is determined by the number of electrodes of the armature 2, and the mold 52 having an arcuate recess 52a. Thus the coil 41 is formed into a sector having a center angle corresponding to the center angle θ of each armature segment 34. Actually the mold 51 is fixed and the mold 52 is movable from up to down toward the mold 51 as shown by an arrow B in FIG. 10. Therefore the mold 52 may press the coil 41 against the mold 51 as shown in FIG. 11 to form the coil 41 into the iron core 9 of sector having the predetermined center angle θ as shown in FIG. 12. Thus the iron core 9 is produced.

Instead of individually producing the iron core 9 with the leaf plate 39 of a predetermined width as above explained, it may be more efficient to produce the iron core 9 by firstly winding a wider leaf plate around the core shaft 40 to make a coil, then by pressing the coil by means of the molds 51, 52 to form the coil into a sector in vertical section and finally by cutting the sector of winder leaf plate to provide the individual iron cores 9 of the predetermined width as shown in FIG. 12.

The iron core 9 thus produced may be wound therearound with the electrically conductive wire or leaf 33 or the iron core 9 may be inserted into an axially hollow portion of separately wound wire or leaf 33 to form up the armature segment 34. In any events, the iron core of wound leaf plate 39 will be preferable to the solid iron core for remarkably increasing the coercive force to thereby remarkably increase the torque of armature 2.

Figure 2:
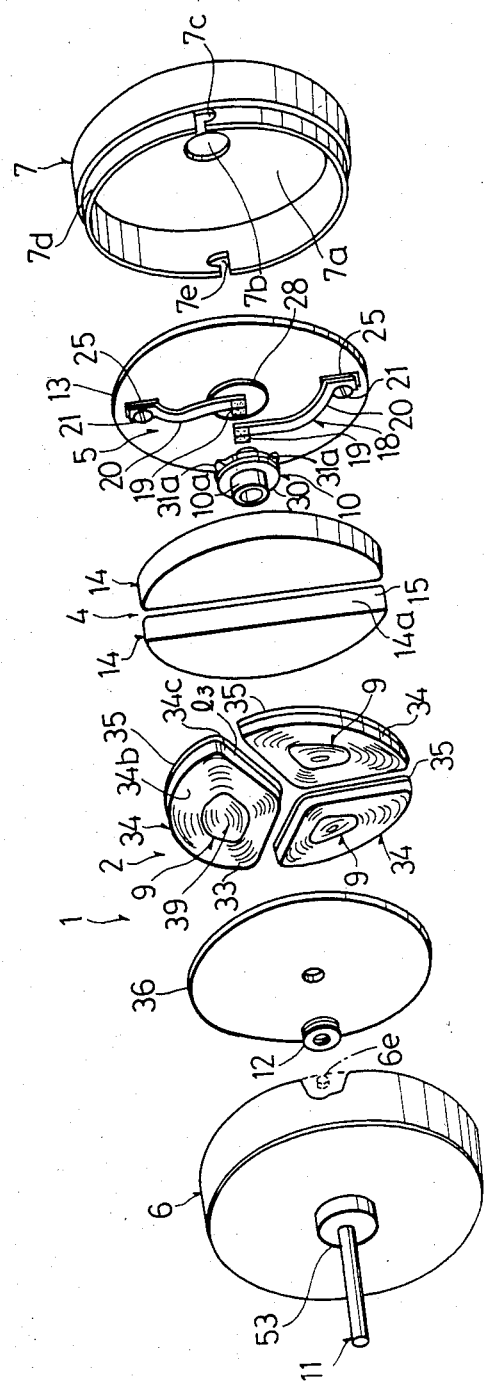
FIG. 2 is an exploded perspective view of the electric motor.
Figure 14:
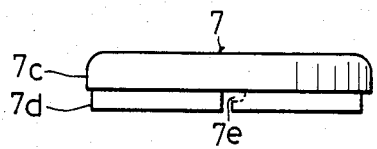
FIG. 14 is a plan view of the motor case counterpart as shown in FIG. 13.
Figure 13:
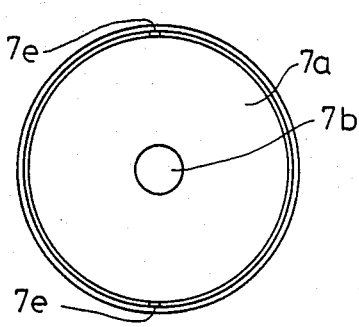
FIG. 13 is a front elevational view of one of the motor case counterparts showing the inner side thereof.
Figure 15:
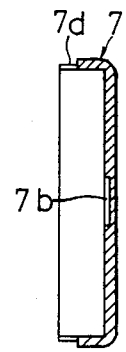
FIG. 15 is a vertical section of the motor case counterparts as shown in FIG. 14.
Figure 17:
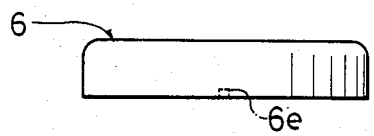
FIG. 17 is a plan view of the motor case counterpart as shown in FIG. 16.
Figure 16:
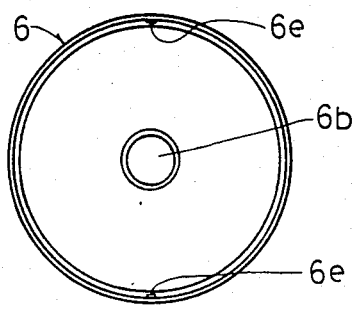
FIG. 16 is a front elevational view of the other of the motor case counterparts showing the inner side thereof.
Figure 18:
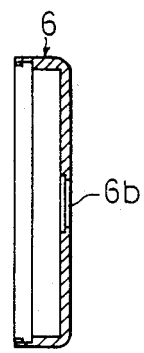
FIG. 18 is a vertical section of the motor case counterpart as shown in FIG. 16.

In reference to FIGS. 2, 14 and 18, as aforementioned, since the magnetic circuit of this electric motor 1 is formed by the magnetic segments 4, the mount plate 13 and the armature structure 2, the motor case 6, 7 may be precluded from the magnetic circuit, and therefore may be made of non-iron material such as a synthetic resin. However in this case, the synthetic resin is not sufficient to absorb the noise of the electric motor 1 especially when the motor 1 is used in the instruments having electronic elements to be conducted with weak electric current. It is therefore preferrable to form the case 6, 7 with the powders of magnetic material such as iron powders being mixed therein so as to prevent the noise of the motor 1.

In reference to FIGS. 13 to 18, the motor case is composed of a pair of counterparts 6, 7, one 7 of which has a wall 7a having an opening 7b formed at the center thereof. The counterpart 7 has further a wall 7c of a larger diameter formed circumferentially thereof and extended axially thereof and a wall 7d of a smaller diameter axially extended from the wall 7c. The wall 7d has a pair of L-shaped grooves 7e formed therein at the positions diametrically opposite to each other, each of the grooves 7e extending axially and then circumferentially of the wall 7d. The wall 7d has the inner face to be fittedly engaged by the outer circumference of the mount plate 13.

The other counterpart 6 is of the same configuration with the counterpart 7, and has the circumferentially and axially extended wall having the inner face to be fittedly engage the outer face of the wall 7d of smaller diameter of the counterpart 7. As shown, the counterpart 6 is provided with a pair of projections 6e opposite to each other diametrically at the inner face thereof. The counterpart 6 is therefore fixedly connected to the counterpart 7 by engaging the projections 6e into the L-shaped grooves 7e of the counterpart 7 and then by turning the counterpart 6 in one direction with respect to the counterpart 7. Further the counterpart 6 has an opening 6b formed at the center thereof and a bearing 53 secured to the opening 6b for receiving therein the rotating shaft 11 of the motor 1.

With the abovementioned components and the structure of the electric motor 1. The motor is assembled as follows: In reference to FIGS. 1 and 2, the commutator 10 is designed to have an outer diameter which is smaller than the width of the groove 15 between the magnet segments 14. The commutator 10 has an axially extended cylindrical projection 10a to be pressed around an axial projection 36a of the disk plate 36. On the other hand, the iron cores 9 and the armature windings 33 are combined to each other respectively to form up the armature segments 34, each of the individual plates 35 is attached to each of the armature segments 34 on one side 34a thereof, and then the disk plate 36 is attached to the armature segments 34 on the opposite side 34b thereof in the manner that the disk plate 36 will traverse all of the armature segments 34. If it is required, another set of the armature segments 34 may be attached to the opposite side of the disk plate 36. Thus the armature 2 is finished up, and the armature segments 34 are each connected by leads to the commutator 10 and then the rotating shaft 11 is pressed axially into the disk plate 36 and into the commutator 10.

The mount plate 13 is, together with the pair of brush units 18, secured to the counterpart 7 of the motor case by means of the screws 21 and nuts 22 all through the isolating elements 24 and washers 25 positioned therebetween. In this instant, the terminals 26 are secured on the outside of the motor case 7 by the same screws and nuts. In case the motor case 7 is made of an electrically conductive material, it is required to insert an isolating element between the case 7 and the terminal 26, the screw 21 and the case 7. Thus the pair of carbon brush elements 19 are arranged at the positions where these are adapted being opposite to the commutator 10 and are pressed against the commutator 10 under the action of the respective leaf springs 20 carrying these carbon brush elements respectively.

Then the magnet segments 14 are attached to the mount plate 13. The armature 2 having the rotating shaft 11 is then added while the end 11a of rotating shaft 11 is inserted from the left to the right in FIG. 2 into the bearing 28 at the center of the case 7 and simultaneously the commutator 10 is partly inserted in the groove 15 provided between the magnet segments 14. In this case, the magnet segments 14 may be attached to the mount plate 13 before the latter is secured to the motor case 7.

Since the commutator 10 is of a flat-type, the commutator 10 is lightly pressed against the pair of carbon brush elements 19 against the action of the leaf spring 20. In this respect, the flat-type commutator of the invention is more easily assembled when compared with the conventional cylindrical commutator.

Finally the other counterpart 6 of the motor case is fixedly connected to the counterpart 7 while the rotating shaft 11 is axially passed through the center bearing 53 of the motor case 6 and the pair of diametrically opposite projections 6e of the case 6 are inserted into the L-shaped grooves 7e of the counterpart case 7 and then the case 6 is turned in the clockwise direction in FIG. 2. Thus the assembly operation of the electric motor is finished.

As is apparent from the foregoing explanation, it is very easy to assemble the electric motor of the invention. Moreover the pair of brush units 18 are completely accommodated in the groove 15 between the magnet segments 14 having the thickness of dimension larger than the dimension of the brush units 18 in the axial direction of motor 1, and therefore there is no need to separately provide a space for accommodating therein the brush units. This results in making the electric motor 1 more flat, i.e. reducing the thickness of the motor 1 up to 5.2 mm. Thus an extremely flat motor may be realized.

The properties of the electric motor 1 are as follows: In reference to FIGS. 3 and 7, the dividing lines $l_1$ of the magnetic segments 14 are extended non-radially of the rotation axis O of the motor shaft 11 while the dividing lines $l_3$ of the armature segments 34 are extended radically of the rotation axis O of the motor shaft 11, and are extended in parallel with a normal which is extended radially from the rotation axis O of the motor shaft 11. Therefore if the armature segments 34 are rotated in the clockwise direction as shown by the arrow C in FIG. 3, each armature segment 34 comes into the magnetic field of the magnet segments 14 progressively from the outward end 34c (in FIG. 2). Namely each armature segment 34 comes progressively into the magnetic field of each magnet segment 14 in such a manner that the circumferential initial intersection P between the armature segment 34 and the magnet segment 14 will progressively shift inwardly along the dividing line $l_1$ of the magnet segment 14. This means that the distribution of magnetic flux will be progressively changed each time the armature segment 34 travels past the electric positions to thereby reduce the variations of torque of the armature 2, i.e. to reduce the variations in the rotation of the armature 2. This effect is same in another embodiment as shown in FIG. 5 where the magnet 4 is divided into four segments 14.

In reference to FIGS. 1 and 2, as to the brush mounting device 5, the brush units 18 are completely accommodated in the groove 15 between the magnet segments which have the thickness of a predetermined dimension larger than the dimension of brush units 18 in the axial direction of motor 1. Therefore the thickness t of the motor 1 may be made extremely flat, for example, up to approximately 5.2 mm. Instead of reducing the thickness of motor 1 to such an extent, the magnet 4 or the armature 2 may be made thicker in case the thickness of motor 1 is maintained as in the conventional one. In this case, it is needless to say that the electric motor will have a far more powerful torque than that of the conventional flat-type electric motors. Such an extremely flat motor 1 of the invention will be sufficient enough to realize a stereo-cassette tape recorder having only the thickness corresponding to the width of the cassette tape, and it will be apparent from the description therein that the electric motor 1 of this invention is so designed to give a sufficiently high powered output as required in the usage thereof in combination with such an audio instrument.

Further the armature 2 is composed of a plurality of armature segments 34 each having the dividing plate 35 of magnetic material attached to one side thereof and having a disk plate 36 of magnetizable material attached to the opposite side thereof traversing all of the armature segments 34 to thereby form a closed magnetic circuit together with the magnet segments 14 and the mount plate 13, through the closed magnetic circuit the magnetic flux of the magnet 4 and the armature 2 circulates. Therefore a powerful torque may be obtained by precisely designing the air gap 3 between the magnet 4 and the armature 2. Moreover the space 38 between the armature 2 and the motor case 6 may be precluded from the magnetic circuit, and accordingly there is no need to take a special care for designing the dimensions of the space which is absolutely required in the conventional motor of ferrite magnet.

Thus the flat-disk like electric motor of the invention is not required to use the samarium cobalt permanent magnet of higher cost or the like for the purpose of increasing the output. Instead the ferrite permanent magnet of lower cost is sufficient enough to maintain a required high output corresponding to the output which may be obtained when the high cost and powerful permanent magnet is used.

Still farther according to the invention, the motor case 6, 7 may be made of any materials including iron. For example, the motor case may be made of a synthetic resin which is easily modified in the colour as well as in the design. In this case, the motor case of synthetic resin will be more complete to prevent the noise of the motor causing the radio interferences if the iron powder, as one of the examples, is mixed in the synthetic resin.

The invention having been thus described, it will be obvious to variously modify the same. Such modifications or variations will not be regarded as a departure from the spirit and scope of the invention, and all such modifications or variations will be included within the scope of the following claims.

What is claimed is:

1. A small disk-shaped electric motor comprising: a case; armature means supported for rotation in said case, said armature means including a plurality of flat armature segments and a first magnetizable disk having a rotation axis and carrying on one side thereof said armature segments around said rotation axis, said armature segments each having generally radial edges extending from said rotation axis, the radial edges of each armature segment subtending an angle of less than 180°, the edges of adjacent armature segments being spaced and generally parallel to each other; permanent magnet means in said case and including a pair of permanent magnet segments, each of generally semicircular form, and a second magnetizable disk arranged coaxially with said armature means and fixedly carrying on one side thereof said permanent magnet segments with an air gap provided between said permanent magnet segments and said armature segments, said semicircular permanent magnet segments being arranged opposite to each other and spaced to define a straight groove of a predetermined axial depth and of constant width extending diametrically of the rotation axis of said armature means, the constant width of said groove being greater than the width of the space between adjacent armature segments; commutator means including a commutator element secured to said armature means for rotation therewith, said commutator element extending axially of said armature means to be in said groove; brush means including a pair of brush elements arranged in said groove, one to each of opposite sides of the rotation axis of said armature means; and holding means including a pair of elastic members arranged in said groove and normally pressing said brush elements against said commutator elements; said first and second magnetizable disks forming magnetic circuits with said armature means and said permanent magnet means, respectively.

2. The electric motor as defined in claim 1, wherein said case is made of a synthetic resin having iron powder mixed therewith to prevent a noise of the electric motor which may otherwise be produced while the latter is energized.

3. A small disk-shaped electric motor comprising: a case; armature means supported for rotation in said case, said armature means including a plurality of flat armature segments and a first magnetizable disk having a rotation axis and carrying on one side thereof said armature segments around said rotation axis, said armature segments each having generally radial edges extending from said rotation axis, the radial edges of each armature segment subtending an angle of less than 180°, the edges of adjacent armature segments being spaced and generally parallel to each other; permanent magnet means in said case and including four permanent magnet segments, each of sector configuration, and a second magnetizable disk arranged coaxially with said armature means and fixedly carrying on one side thereof said permanent magnet segments with an air gap provided between said permanent magnet segments and said armature segments, said sector-shaped permanent magnet segments being arranged opposite to each other and spaced to define two straight and mutually perpendicular grooves of a predetermined axial depth and constant width extending diametrically of said rotation axis, the constant width of said grooves being greater than the width of the space between adjacent armature segments; commutator means including a commutator element secured to said armature means for rotation therewith, said commutator element extending axially of said armature means to be located at the intersection of said diametrically extending grooves; brush means including a pair of brush elements arranged in one of said grooves, one to each of opposite sides of said rotation axis; and holding means including a pair of elastic members arranged in said one of said grooves and normally pressing said brush elements against said commutator element; said first and second magnetizable disks forming magnetic circuits with said armature means and said permanent magnet means, respectively.

4. The electric motor as defined in claim 3, wherein said case is made of a synthetic resin having iron powder mixed therewith to prevent a noise of the electric motor which may otherwise be produced while the latter is energized.

5. The electric motor as defined in claim 3, wherein said armature segments are each composed of an iron core and an electrically conductive material wound around said iron core.

* * * * *